3,330,676
MANUFACTURE OF TAR IMPREGNATED REFRACTORIES

Ernst Ellsiepen and Josef Wuhrer, Wulfrath, Germany, assignors to Dolomitwerke GmbH, Wulfrath, Germany
No Drawing. Filed Oct. 1, 1965, Ser. No. 492,325
Claims priority, application Germany, Oct. 2, 1964, D 45,543
6 Claims. (Cl. 106—58)

This invention relates to refractory lime containing shapes having improved storage life.

It is well known that dead burned dolomite and mixtures of dolomite and lime are excellent refractory materials but have the drawback that the lime component is susceptible to hydration, which causes destruction of the refractory. In order to improve the storage properties, it has been customarily to impregnate the burnt shapes or bricks in a tar or pitch bath. Nonetheless, the obtained results have not yet been satisfactory.

It is, therefore, a principal object of the invention to provide a method by which the storability of tar bonded dolomite and similar shapes is considerably increased.

Other objects and advantages will become apparent from a consideration of the specification and claims.

In accordance with the invention, the storability of tar impregnated high temperature refractories on the base of lime, and/or dolomite, and/or magnesite, or mixtures thereof, is considerably improved when the refractory is impregnated with a tar or pitch which contains highly disperse substances whose mean particle size is smaller than the mean pore size of the refractories. We have found that the addition of such highly disperse substances fills better the pores and produces a more homogeneous and denser protective surface layer. When the pores are filled with the mixture of tar or pitch and finely dispersed substances, the diffusion of moisture into the refractory is impeded which results in extending its storage life up to about 45 percent.

Suitable finely disperse substances are all those which cannot enter into harmful reactions with the sintered dolomite or its components, and which do not, or only negligibly, interfere with the refractory properties of the bricks. Such substances are, e.g. rock dust; finely ground dolomite, limestone or magnesite; also dusts or fines of kaolin, talcum, graphite; coal and coke dust, and the like.

Of particular advantage are such finely dispersed substances which are capable of binding water physically and/or chemically, for instance burnt lime or soft burned dolomite. Such substances have the property of absorbing moisture from the air under volume increase; they are able to absorb moisture diffusing through the tar or pitch layer and to keep it away from the refractory material. The volume increase produced by the absorbed moisture in the finely dispersed substances results in an effective closure of the pores.

Substances which absorb moisture essentially physically are, for instance, silica gel, active alumina, activated carbon, and other materials having a large specific surface.

It is, of course, also possible to combine different highly disperse substances; for instance, the pitch or tar used for the impregnation may contain calcium oxide and silica gel, or active alumina and activated charcoal, or such mixtures together with coal dust.

The finely dispersed substances may be added to the tar or pitch in amounts of 1 to 20, preferably about 5 to 10 percent by weight, calculated on the tar or pitch.

Our process is well suited for high temperature refractories which consist, or contain substantial amounts, of lime. It is particularly suitable for the production of bricks or blocks of dead burned dolomite but also useful for the manufacture of bricks and the like from magnesite or other materials containing a substantial content of magnesia.

The process can also be applied to shapes which are coated with an organic protective layer, for instance of tar, pitch, asphalt, bitumen, waxes, and the like.

In order to improve the impregnation, the treatment with pitch or tar may be carried out under reduced pressure, followed, if necessary, by a pressure impregnation.

The following examples are given to illustrate the invention.

Example 1

Refractory bricks were made in the conventional manner from dead burned dolomite.

One group was immersed, also in a conventional procedure, in fluid tar which did not contain any additives.

Another group was immersed, at the same temperature and for the same length of time, into the same tar, which, however, contained 10 percent by weight of raw dolomite fines. The storage life of said group was increased by about 20 percent over the storage life of the first group of bricks.

Example 2

The comparative tests of Example 1 were repeated but a tar was used which contained 7 percent of finely dispersed calcium oxide.

In this case, the storage life of the group of bricks impregnated with the calcium oxide containing tar was prolonged by about 45 percent.

Though we have described our invention for the treatment of refractories fired at temperatures in excess of 1500° C., it may also be used for refractories made from tar-dolomite and similar mixtures baked at low temperatures of about 200–400° C.

We claim:

1. In the method of increasing the storage life of refractory shapes made from magnesite, dolomite, lime, and mixtures thereof by impregnation with a fluid impregnating agent, the improvement which consists in impregnating said shapes with a member of the group consisting of tar and pitch, which member contains 1–20% by weight of a finely divided inorganic substance which does not react with said shapes and has a mean particle diameter which is smaller than the mean diameter of the pores of said shapes.

2. The method as claimed in claim 1 wherein said finely divided substances are capable of binding water physically.

3. The method as claimed in claim 1 wherein said finely divided substances are capable of binding water chemically.

4. The method as claimed in claim 1 wherein said finely divided substances increase their volume when binding water.

5. The method as claimed in claim 4 wherein said substances are members of the group consisting of calcium oxide and soft burned sinter dolomite.

6. The method as claimed in claim 1 wherein the impregnating agent contains 5 to 10 percent by weight of said finely divided substances.

References Cited

UNITED STATES PATENTS

| 3,106,475 | 10/1963 | Davies et al. | 106—58 |
| 3,141,790 | 7/1964 | Davies et al. | 106—58 |
| 3,148,238 | 9/1964 | Willenbrock | 106—58 |

TOBIAS E. LEVOW, *Primary Examiner.*

J. E. POER, *Assistant Examiner.*